United States Patent

[11] 3,577,920

[72] Inventors Melvyn London
Deerfield;
Guy Robert Smetters, Downers Grove;
George Eugene Beck, Prospect Heights, Ill.
[21] Appl. No. 651,986
[22] Filed July 10, 1967
[45] Patented May 11, 1971
[73] Assignee London Litho-Aluminum Company, Incorporated
Lincolnwood, Ill.

[54] METALLIC LITHOGRAPHIC PLATE AND METHOD OF MAKING THE SAME
3 Claims, No Drawings

[52] U.S. Cl. .......... 101/459, 29/470.1
[51] Int. Cl. .......... B41n 1/08, B23k 21/00
[50] Field of Search .......... 96/33; 101/395, 453, 458, 459, 463, 401.1; 29/197, 197.5; 148/34

[56] References Cited
UNITED STATES PATENTS

| | | | |
|---|---|---|---|
| 737,882 | 9/1903 | Strecker | 101/463X |
| 3,250,215 | 5/1966 | Eversheim | 101/149.2 |
| 3,266,900 | 8/1966 | Zelley | 96/75 |
| 3,359,085 | 12/1967 | Anderson | 29/197.5 |

*Primary Examiner*—William B. Penn
*Assistant Examiner*—E. M. Coven
*Attorney*—Pendleton, Neuman, Williams & Anderson

ABSTRACT: Metallic lithographic plate for use in the copperized lithographic printing process, comprising a base layer of magnesium-aluminum alloy and a surface layer sheet of aluminum metallurgically bonded thereto under conditions of temperature and pressure which bring about both physical and chemical changes in said surface layer and place it in a hard tempered condition, the resulting "activated" aluminum surface improving the ease of depositing copper thereon and the durability and tenacity of the copper so deposited in image areas subsequent to development, and also preventing the decomposition of light sensitive diazo compounds in contact with said surface layer.

METALLIC LITHOGRAPHIC PLATE AND METHOD OF MAKING THE SAME

This invention relates to a new and superior metallic photolithographic plate, having as its support a thin layer of activated aluminum superimposed over and formed by appropriate interaction, as hereinafter described, with a thicker layer of magnesium-aluminum alloy.

Photolithographic printing plates are made by placing a light sensitive coating on a supportive material, so that after suitable exposure to light through a positive or negative transparency and appropriate developing and processing, essentially coplanar image and nonimage areas are formed. These areas differ in their ability to accept ink and water.

A variety of materials have been suggested as suitable for the supporting layer for the light sensitive coating in a lithographic plate. The type of support material used for lithographic plates is to a large measure determined by the printing quality required, the length of run on press demanded of the finished plate, and the cost of the material. While nonmetallic support materials, such as plastics and specially impregnated papers have been proposed, metals are used almost exclusively for all but the very shortest runs, due to the hardness, tensile strength and dimensional stability available from certain metals. Most commonly used are zinc and especially aluminum, though for special purposes certain other metals, such as stainless steel or Monel metal (an alloy of approximately 66 percent nickel and 31 percent copper), have been suggested.

There has been an increasing need in the industry for lithographic plates of exceptionally long life and high printing quality on press, and a number of types of plates and processes have been developed in attempts to meet this need.

The most durable lithographic plates are the so-called bimetallic or trimetallic plates. In such plates, the support consists of two different metals, one being water receptive, such as aluminum, stainless steel, or preferably chromium, and the other being ink receptive, usually copper. These two dissimilar metals are electroplated in layers over each other. Because of their high cost, these two dissimilar metals are generally electroplated over a third dissimilar metal, such as steel, which acts an an inert base. The light sensitive coating is applied over the top layer of the two or three dissimilar metals which form the support for the lithographic plate. After exposure to light, processing steps are required so that the surface of the finished plate comprises the top two metals of the support: the water receptive metal makes up the nonimage area, and the ink receptive metal makes up the image area.

While bimetallic or trimetallic plates are very durable on press, they are extremely high in cost, due in part to the expensive processes of electroplating required in their manufacture, and in part to the time-consuming special techniques which must be used in processing such plates after exposure. As a consequence, bimetallic and trimetallic plates have found only a limited use, where because of special circumstances their high cost can be justified.

As mentioned previously, more commonly photolithographic plates are made on zinc or especially on aluminum sheets. Such sheets are generally made of solid, substantially pure, uniform, homogeneous metal, although special alloys have been suggested when circumstances require special physical properties, such as superior tensile strength or limited elongation. The sheets are usually grained before coating, to improve their texture, and sometimes treated with etchants or coatings prior to application of the light sensitive coating, in an attempt to improve various characteristics of the surface on which the light-sensitive coatings are to be applied.

Various ways are known of processing the exposed light-sensitive emulsion on such zinc or aluminum photolithographic sheets. Of these, the process which gives the most durable and highest quality image on press is the copperized process, in which copper is deposited on the lithographic support sheet in the image areas during preparation of the lithographic plate. Ways have been found of depositing copper, either chemically or electrolytically, during processing, on the image areas of aluminum plates. Such copperized plates are relatively durable on press; that is relatively many impressions can be made from them before the image and nonimage areas are no longer sharply delineated one from the other. Such plates are surpassed in durability only by the aforementioned relatively little used, much more expensive, and more difficult to process bimetallic or trimetallic plates.

Heretofore, for best results, preparation of such copperized aluminum lithographic plates generally required the use of a "deep etch" step, which step breaks through the oxide film of the aluminum sheet, permitting relatively good binding of copper to the surface of the plate. Generally, acid solutions containing iron salts are used for such deep etching.

The principal limitation on durability of lithographic plates made by the copperized process is the loss of copper in the image areas while the plate is on press. This loss of copper is due primarily to weakness of the bond between the metal support layer of the lithographic plate and the copper plated thereon. The weaker this bond, the more readily the copper is removed from the plate by the chemical and physical stresses on the plate while it is on press. Once the copper is removed, no further impressions are obtainable from the plate. As a result, many attempts have been made to change the characteristics of the aluminum surface prior to copperizing, so that the copper will be more firmly bound, but such attempts have been only partially successful.

This invention has as its object the preparation of lithographic plates of superior quality and durability which are inexpensive and easy to process.

Another object of this invention is a new type of metallic lithographic plate.

A further object of this invention is the preparation of inexpensive lithographic metallic plates of a quality and durability superior to those made by the copperized deep etch process.

Another object of this invention is an activated aluminum supportive sheet suitable for the preparation of superior lithographic plates by the copperized process.

Yet another object of this invention is the elimination of the necessity for deep etching of aluminum supportive sheets in the preparation of durable lithographic plates made by depositing copper in image areas subsequent to developing.

Still another object of this invention is an aluminum supportive sheet for a lithographic plate, containing an activated surface which improves the ease of depositing copper on the surface, and the durability and tenacity of the copper so deposited.

This invention has a further object the preparation of lithographic plates on which copper is deposited on aluminum subsequent to developing, which copper will be more durable on press than on equal thickness of copper deposited by the copperized process.

Other objects of this invention will become apparent hereinafter.

We have found that if a layer of aluminum is brought into intimate contact to form a metallurgical bond, under appropriate conditions of elevated temperature and pressure hereinafter described, with a layer of aluminum-magnesium alloy, the surface characteristics of the layer of aluminum are altered so as to make that surface superior to supportive material surfaces heretofore available for the copperized lithographic process.

This invention should be sharply distinguished from attempts merely to change gross physical characteristics of the metal supportive layer in the lithographic plate, as for example to increase strength, resistance to cracking, or dimensional stability of the lithographic plate. While these advantages may result from the practice of this invention, they are not the essence thereof. In the present invention, there is an unexpected interaction during metallurgical bonding and thereafter, presumably both chemical and physical, between a sheet of aluminum-magnesium alloy (hereinafter called the "base layer") and a superimposed sheet of aluminum (hereinafter called the "activated surface layer") which interaction profoundly changes (activates) the chemical and physical characteristics of the outer surface of the latter, so that it behaves differently and in an improved manner as compared to aluminum in the copperized process.

Such a result is surprising in that the metal used for the activated surface layer may be the same aluminum commonly used heretofore in making copperized lithographic plates.

We have found that the improved results obtainable from this aluminum surface involves a change which we term activation of the surface of the aluminum, which activation requires appropriate elevated temperatures and pressures while the base layer and surface layer are in intimate contact. If a layer of aluminum is deposited over a base layer of aluminum-magnesium alloy without these appropriate elevated temperatures and pressures, the advantages of this invention are not obtained, even though metallurgical bonding is effected. For example, electroplating a layer of aluminum over a sheet of aluminum-magnesium alloy does not give an activated surface layer. Hot rolling a layer of aluminum over a sheet of aluminum-magnesium alloy so that the sheet produced is in soft condition does not give an activated surface layer. Depositing a layer of aluminum on the base layer by vacuum metallization does not result in an activated surface. If the aforesaid layer of aluminum is laminated to the base layer of aluminum-magnesium alloy with adhesive and pressure without the use of elevated temperatures, no activation results no matter how high a pressure is exerted upon the laminate. Furthermore, no activation results by heating aluminum at elevated temperatures under pressure, unless the aluminum is simultaneously in contact with a base layer as described herein.

We have found that, for successful activation, initial temperatures and pressures must be high enough as to bring the base layer and the aluminum layer to be activated in intimate contact with each other and to effect a metallurgical bond, but that subsequent to this initial period of activation, there must follow a short period of interaction at lower temperature. The initial period of activation effects intimate bonding and contact between the two layers; the final activation period effects a change in crystalline structure in the surface layer in such a way as to make it particularly and uniquely effective for the copperized lithographic process.

During the initial period of activation the layers are brought together in contact with each other, using a temperature of at least about 650° F. and a pressure of at least about 80,000 p.s.i., or in an aluminum rolling mill, a load figure of at least about 4 million pounds; contact time should be between about 10 minutes and 1 hour. The temperature should be high enough as to cause good bonding between the two layers but not so high as to melt or soften the metal sufficiently as to cause a solution effect of the two layers into each other. As a general rule, temperatures of activation during this initial period range between about 650° F. and 850° F. Pressure must be enough to maintain intimate contact. Higher pressures or load figures than those necessary are not deleterious, but are not advised since they are obtained only at an increased cost.

This initial activation step must be followed by a final activation period. This period completes the activation and produces a nonannealed sheet; we have found that in order to obtain the surface structure suitable for use in this invention, the finished support sheet must be in hard tempered condition.

During this final activation step, a pressure of not less than about 60,000 p.s.i., or a load figure of at least about 60,000 pounds must be exerted on the sheet. Higher pressures are not deleterious, but are not advised for economic reasons. This activation step is rapid, being complete probably in less than a second, although a longer period is not detrimental. During this step, the temperature of the sheet is not critical, except that it must not be above that at which recrystallization in absence of pressure may occur—that is, the temperature of the sheet must not be above about 400°—450° F. For reasons of economy, temperatures below room temperature (70° F.) are not used.

Activation may be effected either in a "batch process," as for example in a heated press, or by a continuous process, as in a rolling mill.

For example, a lithographic support sheet for use in this invention may be made by placing a sheet of aluminum over a sheet of aluminum-magnesium alloy in a press which can be heated to the desired temperatures. The sheets are then subjected to a pressure of about 80,000 p.s.i. at a temperature of about 750° F. for 30 minutes, then allowed to cool to a temperature of about 250° F., and a pressure of about 60,000 p.s.i. is applied for between 1 and 2 seconds.

Suitable activated composite support sheets of the aforesaid character may also be prepared in commercial rolling mills and certain sheets of such character now commercially available are satisfactory, provided they are in hard tempered condition; as, for example, Alclad 2024, Alclad 3004, Alclad 6061, Alclad 7075, Alclad 7178, Alclad 7079, Clad 1100/2018, Clad 1145/5050, Clad 1060/6201, Clad 3003/5456, No. 21 Brazing sheet, No. 22 Brazing sheet, No. 23 Brazing sheet, and No. 24 Brazing sheet. This list of examples is not restrictive, but is merely indicative of the kind of rolled sheet that is suitable. (The designations are those of The Aluminum Association; see for example its Standards for Aluminum Mill Products, 1967. The term "alclad" is The Aluminum Associations's abbreviation for aluminum clad products, i.e., wrought aluminum alloy products having a metallurgically bonded coating of aluminum. Others are designated by numbers or by the term "brazing sheet." A person skilled in the art can decide whether a particular commercial rolled sheet is suitable for use in this invention, by ascertaining whether the composition of the sheet and the process by which it is made are as described in this specification.

As mentioned hereinbefore, whether activation is effected by a batch or continuous process, the final sheet should be in hard condition. If it is allowed to soften, as by annealing, the advantages of the activated surface for the copperized lithographic process are decreased or lost. We hypothesize that part of the effect of activation is to introduce an internal stress in the outer surface of the activated surface layer; annealing or softening may allow the stress to dissipate by realignment of the crystalline structure, with consequent decrease in activation.

The thickness of the activated surface layer is important. If this layer is too thin, the aluminum-magnesium alloy used for the base layer may be exposed during preparation or use of the lithographic plate, destroying the usefulness of the plate. If, on the other hand, the activated surface layer is too thick, activation does not result, presumably because there is insufficient interaction between the base layer and the outside surface of the surface layer. The plate then behaves like a conventional aluminum plate.

We have found that the activated surface layer must be no less than about 0.00025 inch and no more than about 0.003 inch thick, and that best results are obtained when this layer is between about 0.0005 and 0.0015 inch thick.

The thickness of the base layer is not critical; it should be sufficiently thick that the combined thickness of it and the activated surface layer be that of the usual metallic lithographic support, that is, between about 0.006 and about 0.030 inch.

The aluminum metal used in this invention for the activated surface layer is substantially pure aluminum, containing only minor amounts of other metals found in commercial aluminum sheets. Such aluminum commonly assays at least about 97 percent aluminum; other metals present are minor impurities inherent in the process of manufacture, or minor constituents introduced to modify physical characteristics, such as hardness or tensile strength. Such minor impurities or constituents, except magnesium, are of no significance in the present invention. It does not matter whether they are present or not, except insofar as they may exert, in excess quantity, known detrimental effects on the physical properties of the sheet. Magnesium, however, must be substantially absent; no more than about 0.3 percent may be present. It is surprising that, whereas it is necessary to have magnesium in the base layer in order to activate the surface layer, presence of more than a trace of magnesium in the surface layer to be activated must be avoided. An appreciable percentage of magnesium in the surface layer to be activated results in a support sheet which, when used in the copperized lithographic process, gives a plate with a spongy copper deposit of relatively low adherence and abrasion resistance; the bond is so poor that frequently the copper plate can be removed simply by wiping with a cloth.

The aluminum-magnesium alloy used for the base layer in this invention is the aforesaid substantially pure aluminum, containing magnesium in alloy to the extent of between about 0.4 percent and 6.0 percent, preferably between about 0.8 percent and 1.8 percent. As in the case of the activated surface layer, the presence or absence of minor amounts of other metal is of no significance to the present invention.

In preparation of a lithographic plate for use in the copperized process, a light-sensitive emulsion is placed as a coating over one face of a metal support sheet, which face is usually pretreated, by graining and other procedures, previous to coating. The usual lithographic support sheet, being homogeneous, can be grained and coated on either face, the faces being substantially equivalent.

In the present invention, it is essential that the activated surface layer rather than the base layer surface by grained and coated. The two faces of the activated support sheet described heretofore are not equivalent, one being the activated surface, the other being the base layer. For the convenience of the lithographer, the activated surface layer may be marked in some distinguishing way, so that the wrong surface is not inadvertently used. However, those preparing lithographic plates are not in the habit of paying attention to which side of a metal support sheet they use. It is readily possible to avoid any possibility of error by activating both surfaces of the metal supportive sheet. Such a sheet can be prepared by making a "sandwich"; that is, layers of aluminum are brought into intimate contact, under conditions as described hereinbefore, with both upper and under surfaces of a sheet of aluminum-magnesium alloy. In other words, a base layer is placed between two sheets of surface layer, which are then activated as described herein. The already described principles of activation are in no way changed by this modification, except that as a result both outside surfaces of the plate are activated by their interaction with the base layer. Such modification gives a three-layer rather than a two-layer support sheet, but there is no significant difference except that either face of the three-layer sheet may be used for coating, whereas in the two-layer sheet only the activated surface is suitable.

The preparation of lithographic plates by the copperized process is well known to the art of lithography. Most commonly, aluminum sheets are used as a support in this process. The usual steps in the preparation of a copperized lithographic plate involve graining of the support sheet; counteretching, which may include in addition or as a substitute other surface treatments; coating with a light-sensitive mixture; exposing to light through a photographic film; developing deep etching; plating the image areas with copper; lacquering and inking; removing the hardened resist or stencil; gumming the plate; washing out the ink and treating with asphaltum.

Variations of this process are known to the art, as for example, elimination of graining, elimination of counteretching by incorporating special ingredients during the graining step, or elimination of the deep-etch step by a more complete than usual development of the exposed plate. Such variations do not accomplish the purpose of his invention, nor do they influence its practice.

Most commonly, a natural gum such as gum arabic, combined with dichromate as sensitizer, is used as the light-sensitive coating. Alternately, other materials may be used in place of natural gums, as for example, water soluble polymers such as hydroxyalkyl ethers of cellulose, polyvinyl alcohol, or the reaction product of polyvinylpyrrolidone and polyacrylic acid. Diazo compounds may be substituted for dichromates as the sensitizer. For the operation of this invention, the nature of the light-sensitive coating is not of importance; if the preparation of the plate involves plating of copper on the image area in the presence of a light hardened stencil, or resist, the use of an activated aluminum support layer will give the advantages herein described. So-called presensitized plates and wipe-on plates are included in the scope of this invention, so long as copper plating is used in the image area. In the case of certain presensitized plates, this invention is useful even in the absence of copperizing, as described below.

We have found an additional unexpected advantage for support sheets prepared as described herein. The metallic support sheets available heretofore are not inert towards diazo compounds used as sensitizers in coatings for presensitized plates, tending to cause premature decomposition of such diazo compounds. For this reason, it has been found necessary to treat the support sheet, prior to putting on the light-sensitive diazo-containing coating, with a material which prevents direct contact between the metal and the light-sensitive coating, as for example with silicates or with various polymers. Such treatment is rendered unnecessary by the use of support sheets containing an activated aluminum surface layer. This advantage accrues to the use of such support sheets for the preparation of presensitized lithographic plates containing diazo compounds in the light-sensitive coating, whether the copperizing process is used or not. While we are not certain of the reason for this advantage, it is unquestionably related to the change in chemical and physical structure of the aluminum surface effected by activation.

Copperizing of the image area of lithographic plates was developed to satisfy the need for lithographic plates which are durable on press. A major factor in such durability is the tenacity of bond between copper deposited in the process and the surface of the support member. Many of the variations proposed for the copperized process have been suggested to improve the bonding of copper. For example, various surface treatments of the metal support prior to coating have been tried. Indeed, it is usually considered essential to "deep etch" the sheet prior to plating copper, to improve copper bonding by replacing with iron the coating of aluminum oxide always present on aluminum surfaces exposed to air. This practice is so widespread the term "deep-etch plates" is commonly used in the lithographic art. Some lithographers have tried to eliminate the deep-etch step and to effect an equivalent bonding of copper to the support sheet by more complete development of the exposed plate, since deep etching has certain inherent disadvantages.

Counteretching is employed prior to coating as another method to improve copper bonding. Counteretching removes the relatively thick, hard surface coating of aluminum oxide, so that coppering is effected through a relatively thin, soft layer of aluminum oxide.

Despite resort to such steps as counteretching and deep etching, deposition of copper on image areas is not completely satisfactory with the aluminum support layers available heretofore. Deposition of copper on the image areas tends to be slow, and the copper so deposited exhibits a tendency to pull off on press. This latter tendency is especially evident in small copper dots during long runs on high-speed presses.

We have found that if a sheet with an activated aluminum surface, as hereinbefore described, is used as the support member in the copperized process, copper is deposited more readily, more rapidly and with a better bond, so that the resultant lithographic plate has a longer press life. In addition, the deposited copper has a harder structure, so that its resistance to forces of abrasion are greater; this fact, too, leads to a longer press life of the finished plate. So striking are these effects that excellent copper deposition is achieved even though both counteretching and deep etching steps are eliminated.

Elimination of the counteretching and deep etching steps in the preparation of copperized lithographic plates without adversely affecting plate quality and life is in itself highly desirable. These steps are time consuming and require the use of expensive chemicals; omitting the steps offers a decided economic advantage to the plate maker. Furthermore, the deep etch step requires careful control; either insufficient or too vigorous deep etching affects plate quality. What is more, if the iron containing deep etch solution is not completely removed prior to copper deposition, the solution interferes with deposition by "chewing away" copper dots.

The principal advantage of the use of an activated aluminum support sheet, namely of obtaining a harder, more tenacious copper deposit so that press life is exceptionally long, is however not dependent on the retention or elimination of the counteretch and deep etch steps. If the lithographer, despite the economic advantages of omitting these steps, for some reason wishes to maintain one or both of these steps, he may do so by controlling the strength of the etching solutions and the length of time they are allowed to be in contact with the support sheet. The lithographer need merely use weaker solutions or a shorter contact time, so that pitting of the image area is avoided.

The following examples are given to illustrate several embodiments of the invention. Details of the preparation of the lithographic plate on the support sheet are merely illustrative of processes well known to the art, and may be varied by those skilled in the art. Such variations will not effect in any significant manner the practice of the invention as described herein.

EXAMPLE I

The support sheet used aluminum a 19¾ inch by 23 inch piece of Alclad 3004, which consists of a base layer of aluminum alloy containing 0.8—1.3 percent magnesium, covered on both sides by aluminum containing 0.1 percent of magnesium, and prepared in an aluminum rolling mill. The sheet has a total thickness of 0.010 inch; each activated surface layer has a thickness of 0.001 inch, by rolling at a temperature of 650° F. and a pressure of 80,000 p.s.i. for one hour and then rolling at a temperature of 350° F. and a pressure of 60,000 p.s.i. for ½ second.

One side of the support sheet is mechanically or chemically grained. The grained surface is then coated with a light-sensitive emulsion in a whirler, which causes the emulsion to flow evenly over the entire surface of the plate. The emulsion is prepared, for example, by blending 28.4 g. of gum arabic in water to make 100 ml., adding 950 ml. of 14° Be. sodium dichromate and adjusting to a pH of 8.7 with 28 percent ammonium hydroxide. If desired, a wetting agent may be added to improve distribution over the plate.

After the emulsion has dried, the coating is exposed to a light source by known techniques through a photographic positive, and is then developed by treatment with a solution of 320 ml. of 85 percent lactic acid, 1,400 g. calcium chloride, 700 g. zinc chloride and 2,000 ml. of water.

The developed plate is connected as the cathode in a direct current circuit, as is known in the art. The anode is a copper plate fixed in a plastic holder and covered with an absorbent material like lambs wool. The anode dauber assembly is saturated with electrolyte solution. This solution is prepared by combining 11.4 g. copper nitrate, 29.5 ml. concentrated hydrochloric acid and 875 ml. methyl alcohol. The developed plate is placed in a trough containing electrolytic solution, and while 12 volts is imposed across the circuit, the dauber is rubbed back and forth over the developed plate, to deposit copper in the image areas.

After copperizing is completed, the plate is washed with alcohol to remove the plating solution. The plate is then coated with lacquer and then with ink. Next the plate is soaked in warm water and scrubbed to remove light-hardened stencil. The plate is then treated with 1 percent phosphoric acid, washed with water and coated with a thin layer of gum arabic to protect it.

EXAMPLE II

The support sheet used is a 17 inch ×22 inch piece of Alclad 1060/5052, which consists of a base layer of aluminum alloy containing 2.2—2.9 percent magnesium, covered on one side by aluminum substantially free of magnesium, and prepared in an aluminum rolling mill by rolling at a temperature of 750° F. and a pressure of 90,000 p.s.i. for one-half hour, and then rolling at a temperature of 400° F. and a pressure of 70,000 p.s.i. for 2 seconds. The sheet has a total thickness of 0.020 inch; the activated surface layer has a thickness of 0.0008 inch.

The covered side of the support sheet is ball grained, counteretched with a dilute aqueous solution of acetic acid and rinsed with water. The grained side is then whirl coated with a mixture of four parts polyvinylpyrrolidone, 0.25 parts polyacrylic acid, one part sodium salt of 4,4′-diazostilbene-2-2′ disulfonic acid, 0.3 parts sodium azide, 0.2 parts wetting agent, and 94.25 parts water. The coated plate is allowed to dry in the whirler.

The coated sheet is exposed to a carbon arc lamp through a photographic positive in the usual manner, and then developed with a mixture of 33.0 parts water, 1.6 parts hydroxyacetic acid and 39.8 parts ethylene glycol.

The plate is then deep etched with a mixture of 1,000 parts aqueous calcium chloride solution (40°—41′ Be.), 380 parts zinc chloride, 285 parts aqueous ferric chloride solution (50°—51° Be.), 14 parts aqueous HCL solution (37—38 percent) and 27 parts cupric chloride dihydrate. Control time with the etchant is 15 seconds. The plate is then washed thoroughly with 99 percent isopropanol to remove all etching solution.

Copper is now plated onto the image areas chemically, using a solution containing 31 grams of cuprous chloride in 32 ml. of 37—38 percent HCl and 1,000 ml. of 99 percent isopropanol. After copperizing is complete, excess solution is removed with 99 percent isopropanol.

The plate is then lacquered and inked in the usual manner, then submerged in warm water and brushed lightly to remove hardened stencil. The plate is now coated with a solution of gum arabic in phosphoric acid and dried. The finished plate is now ready for inking and putting on press.

EXAMPLE III

The support sheet used is prepared by placing a 0.003 inch thick sheet of aluminum (AA Designation 2219) containing 0.02 percent magnesium on a 0.03 inch thick sheet of aluminum-magnesium alloy (AA Designation 5154) containing 3.1—3.9 percent magnesium in a press. The surfaces of the two sheets are brought into intimate contact with each other by applying a pressure of 90,000 p.s.i. and a temperature of 700° F. These conditions are maintained for 45 minutes. The sheets are now metallurgically bonded at their common surfaces to form one sheet. This sheet is removed from the press.

The sheet is put into a press and subjected to a pressure of 65,000 p.s.i. for about 5 seconds, without supplying external heat.

The aluminum side of the resultant support sheet is grained, rinsed with water and dried.

A thin coating of a mixture of 26.5 g. of 30 percent ammonium dichromate and 100 g. of 60 percent larch gum is then wiped on the sheet, and dried in a current of air from a fan.

The coated sheet is exposed to light and developed in any of the methods well known to the art. Copper is then plated on the image areas either by chemical deposition (as for example as described in example II) or electrically (as for example as described in example I). Deep etching prior to plating is optional.

Further processing of the plate to prepare it for press is effected by usual methods know to the art, as for example in examples I and II.

We claim:

1. The method of forming a metallic lithographic printing plate comprising the steps of:

placing a baseplate of aluminum and magnesium alloy and an aluminum surface layer in overlying relationship;

bonding said baseplate and said surface layer together by subjecting them to a pressure of at least 80,000 p.s.i. at a temperature of at least 650° F. for a period of at least 10 minutes;

tempering said surface layer by subjecting said baseplate and said surface layer to a pressure of at least 60,000 p.s.i. at a temperature less than 450° F.; and forming an ink receptive image area of copper deposits on said surface layer.

2. The method of claim 1 wherein said baseplate is substantially pure aluminum having a magnesium content within the range of 0.4 percent to 6 percent by weight and said surface layer is substantially pure aluminum having a magnesium content of less than 0.3 percent by weight and has a thickness within the range of 0.00025 inch and 0.003 inch.

3. The metallic lithographic printing plate formed by the process of claim 2.

UNITED STATES PATENT OFFICE

CERTIFICATE OF CORRECTION

Patent No. 3,577,920 Dated May 11, 1971

Inventor(s) Melvyn London, Guy Robert Smetters and George Eugene Beck

It is certified that error appears in the above-identified patent and that said Letters Patent are hereby corrected as shown below:

Column 2, line 49 - "a" should be --as--.
Column 4, line 29 - After "brazing sheet." insert a parenthesis.
Column 5, line 26 - "by" should be --be--.
Column 5, line 35 - "both" should be italicized.
Column 5, line 67 - "his" should be --this--.
Column 7, line 27 - "effect" should be --affect--.
Column 7, line 30 - Delete "aluminum" and insert --is--.
Column 8, line 26 - "40°-41' Be." should be --40-41° Be.--.
Column 8, line 28 - "HCL" should be --HCl--.
Column 8, line 71 - "know" should be --known--.
Column 9, line 9 - "forming" should begin a new line.

Signed and sealed this 28th day of September 1971.

(SEAL)
Attest:

EDWARD M.FLETCHER,JR.
Attesting Officer

ROBERT GOTTSCHALK
Acting Commissioner of Patents